July 3, 1945.  F. T. BLAYDES  2,379,781
AGRICULTURAL IMPLEMENT
Filed May 31, 1943  2 Sheets-Sheet 2

Inventor:
Frederick T. Blaydes,
By Paul O. Pippel
Attorney.

Patented July 3, 1945

2,379,781

UNITED STATES PATENT OFFICE 2,379,781

AGRICULTURAL IMPLEMENT

Frederick T. Blaydes, Canton, Ill., assignor to International Harvester Company, a corporation of New Jersey Application May 31, 1943, Serial No. 489,151

2 Claims. (Cl. 97—42)

This invention relates to agricultural implements and, more particularly, to implements utilizing a transverse rotary member or rod adapted to travel below the soil level and dislodge root growth.

An object of the invention is to provide an implement of the type mentioned, for example, a rod weeder, mounted in its entirety on a tractor and deriving power therefrom for the rotation of the rotary rod.

Another object is to provide a novel row crop harvester of the tractor-mounted type utilizing a transverse rotary rod to dislodge the plants from the ground.

A further object is to provide a unitary row-crop harvester having means for dislodging a plant from the soil and means for disposing the vegetation in one or more rows upon the ground.

These and other objects will become clear from the following detailed description when read in conjunction with the accompanying drawings, wherein.

Figure 1:
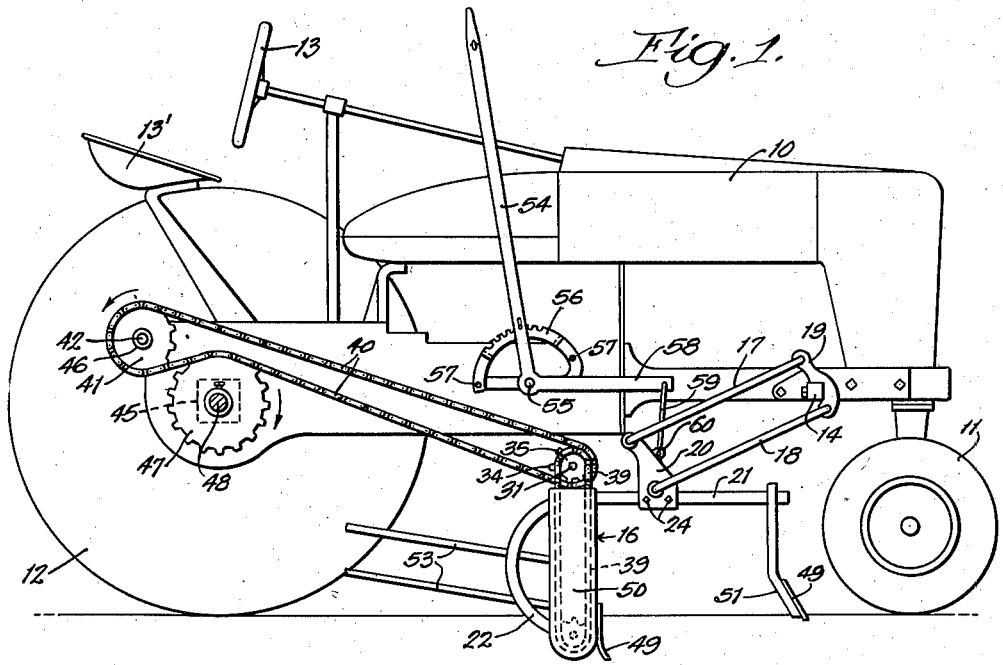
Figure 1 is a view in side elevation of a tractor with one rear wheel removed and illustrating an implement embodying the features of the present invention mounted thereupon.
Figure 2:
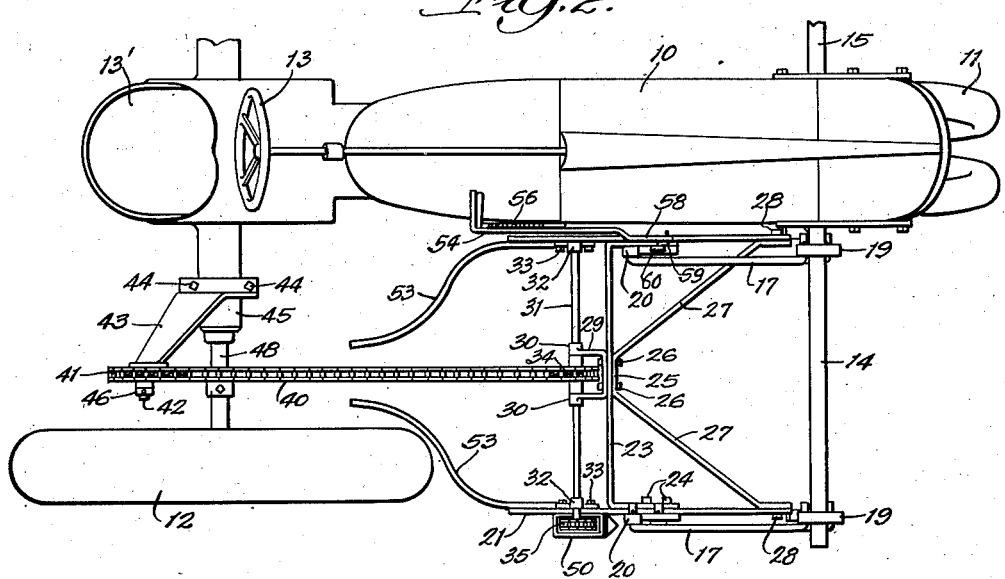
Figure 2 is a plan view of the mechanism shown in Figure 1.
Figure 3:
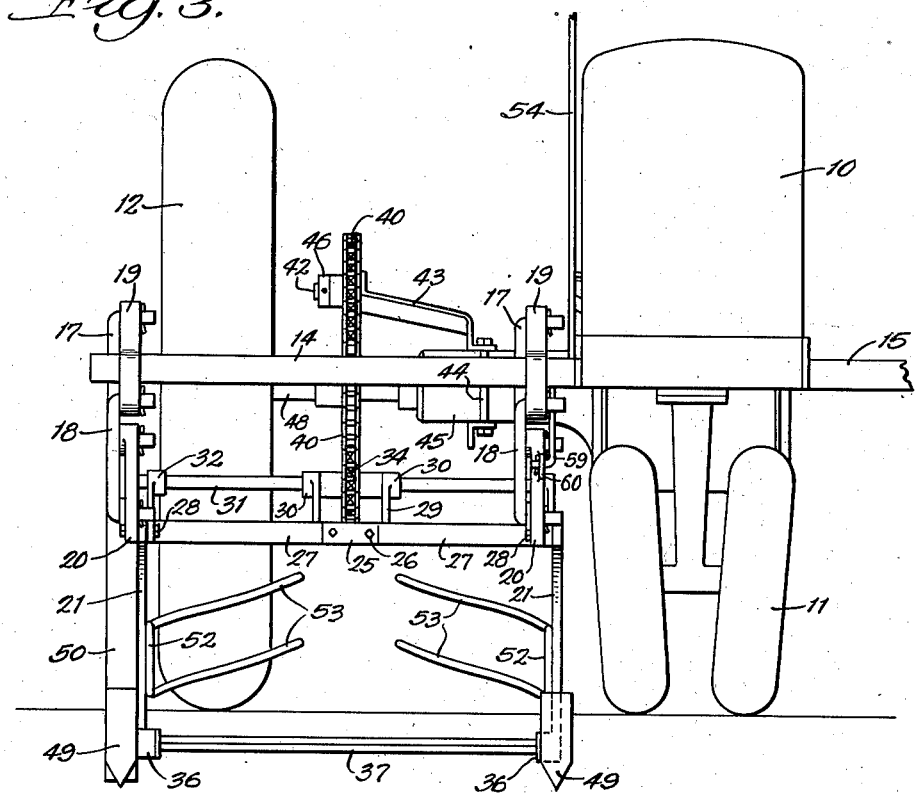
Figure 3 is a front elevation of the tractor and implement shown in Figures 1 and 2.
Figure 4:
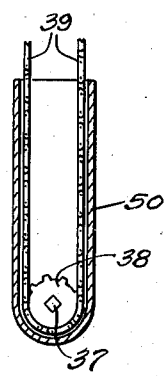
Figure 4 is a detail partly in section, showing a portion of the mechanism by which the rotary rod is driven.

In the drawings, the numeral 10 designates the body portion of a tractor having dirigible front wheels 11 and rear drive wheels 12. The front wheels 11 are steered by a steering mechanism 13 convenient to an operator's station 13'. Supported by the tractor and projecting laterally from opposite sides thereof are transverse tool bars 14 and 15, only a portion of the bar 15 on the left side of the tractor being shown in the drawings. Tool bar 14 on the right side of the tractor supports an implement rig 16 designed to harvest beans and the like. The implement rig 16 comprises laterally spaced pairs of vertically spaced, rearwardly and downwardly extending, parallel links 17 and 18, the forward ends of which are pivotally mounted in brackets 19 affixed at spaced points to the bar 14. The rear ends of links 17 and 18 are pivoted upon laterally spaced brackets 20, to the lower ends of which are affixed longitudinally extending tool beams 21, each having a downwardly and forwardly curved rear end 22. Brackets 20 are maintained in laterally spaced relation by an angle member 23 affixed to beams 21 by bolts 24, which also serve to attach beams 21 to bracket 20. Additional strength is provided by a bracing member having a portion 25 affixed by bolts 26 to the central portion of angle member 23 and having forwardly diverging arms 27 affixed by bolts 28 to the forward ends of the beams 21. Also attached to member 23 by bolts 26 is a rearwardly extending U-shaped member 29 provided with spaced bosses 30, in which is journaled a transverse shaft 31, the ends of which are supported in openings in spaced brackets 32 attached by bolts 33 to beams 21. Between the arms of the U-shaped member 29 a sprocket 34 is keyed to shaft 31, and at the outer end of shaft 31 a sprocket 35 is also keyed thereto. The downwardly curved portions 22 of beams 21 are provided with bosses 36 in which a transverse rod 37 of square cross-section is journaled for rotation. A portion of rod 37 projects through outer boss 36, and the projecting end thereof is provided with a sprocket 38 clearly shown in Figure 4. Sprockets 35 and 38 are connected by an endless chain 39. Sprocket 34 is driven by a chain 40 extending rearwardly to a sprocket 41 freely rotatable on a stub shaft 42 affixed to a standard 43 mounted, by means of bolts 44, on the rear axle housing 45 of the tractor. Sprocket 41 is held against lateral displacement on stub shaft 42 by a collar 46 keyed to the shaft. Chain 40 is driven by contact with a sprocket 47 keyed to the rear axle 48, upon the ends of which rear drive wheels 12 are mounted. Since drive wheels 12 rotate in a clockwise direction with the movement of the tractor, it is clear that sprockets 41, 35, and 38, and, therefore, rod 37, rotate counter-clockwise. Thus rod 37 rotates only with the turning of drive wheels 12; that is, when the tractor is in motion, the rod 37 revolves, but, when the tractor is stopped, the rod 37 also becomes stationary. Since the rod 37 is to travel below the soil level, the ends of curved portion 22 of beams 21 are provided with opener shovels 49 adapted to penetrate into the ground and carry rod 37 with them. While the inner shovel 49 is attached directly to the beam 21, the outer shovel is attached to the front of a housing 50 enclosing the sprocket 38. Housing 50 extends above the surface of the ground and is attached at its upper end to beam 21, as by welding. The function of housing 50 is, of course, to protect that portion of the drive mechanism extending below the surface of the ground and to prevent its fouling by soil or plant growth.

The plant foliage above the ground is divided by dividers 51 affixed to the forward ends of beams 21 in advance of rod 37. Rod 37 is adapted to travel below one or more plant rows, for example, of beans, to dislodge the roots thereof and bring the entire plant to the surface. In order to bring the dislodged plants together and deposit them in a single row on the surface of the ground, a U-shaped member 52 is affixed, as by welding, to the curved portion 22 of each beam 21. These members have rearwardly converging arms or turning rods 53 which direct the plants into a single row. While the equipment for only one side of the tractor has been shown and described, it should be understood that the opposite side of the tractor may be similarly equipped.

In order to move the implement to and from ground-working position and to adjust the depth of operation of the rod 37 in the ground, a lifting mechanism is provided comprising a lever 54 pivoted at 55 upon a quadrant 56 affixed by bolts 57 to the body of the tractor. Lever 54 is provided with conventional detent mechanism and is in reach of the operator from his station 13. Integral with the lever 54 is a forwardly extending arm 58 connected by a rod 59 with a lug 60 affixed to the inner bracket 20.

It should now be clear that a novel and efficient implement has been provided for the harvesting of beans and like row crops. It should likewise be clear that the implement shown and described may function equally well as a conventional rod weeder. In such case, of course, the dividers 51 and turning rods 53 may be eliminated, since the function of a rod weeder is merely to destroy root growth. The advantages of a method such as that hereinabove described for mounting and driving a rotary rod become clear when it is considered that such rotary rods have previously been drawn behind a tractor and have depended for power upon supporting wheels and the like, which were subject to slippage, and failed to transmit uniform power to the rotary rod.

Having now described my invention in its preferred form, it should be understood that modifications may be made therein without departing from the spirit of the invention or the scope of the appended claims.

What is claimed is:

1. The combination with a tractor having dirigible front wheels, a transverse rear axle and rear drive wheels, of vertically spaced substantially parallel links supported upon the forward portion of the tractor and extending rearwardly therefrom, a cultivator rig supported upon said links at the free ends thereof for vertical movement, raising and lowering means mounted upon the side of the tractor and connected to said rig for effecting vertical movement thereof, a transverse rotary rod mounted on said rig to travel below the surface of the ground in advance of said rear axle, a sprocket wheel on said rod, a bracket on the tractor adjacent said rear axle, an idling sprocket wheel rotatably supported on said bracket rearwardly of said rear axle, a forwardly extending endless chain drivingly connecting said idling sprocket wheel and the sprocket wheel on said rod, and a sprocket wheel on said rear axle arranged to drivingly engage the periphery of said chain, whereby the direction of rotation of said rod is the reverse of the direction of rotation of said drive wheels.

2. The combination with a tractor having dirigible front wheels, a transverse rear axle and rear drive wheels, of vertically spaced substantially parallel links supported upon the forward portion of the tractor and extending rearwardly therefrom, a cultivator rig supported upon said links at the free ends thereof for vertical movement, raising and lowering means mounted upon the side of the tractor and connected to said rig for effecting vertical movement thereof, a transverse rotary rod mounted on said rig to travel below the surface of the ground in advance of said rear axle to uproot vegetation, windrow means attached to said rig adjacent said rod and comprising rearwardly converging arms arranged to receive the vegetation uprooted by said rod and deposit it in a row, a sprocket wheel on said rod, a bracket on the tractor adjacent said rear axle, an idling sprocket wheel rotatably supported on said bracket rearwardly of said rear axle, a forwardly extending endless chain drivingly connecting said idling sprocket wheel and the sprocket wheel on said rod, and a sprocket wheel on said rear axle arranged to drivingly engage the periphery of said chain, whereby the direction of rotation of said rod is the reverse of the direction of rotation of said drive wheels.

FREDERICK T. BLAYDES.